(12) United States Patent
McGarry

(10) Patent No.: US 7,882,426 B1
(45) Date of Patent: Feb. 1, 2011

(54) CONDITIONAL CELL EXECUTION IN ELECTRONIC SPREADSHEETS

(75) Inventor: John McGarry, Portland, OR (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/370,705

(22) Filed: Aug. 9, 1999

(51) Int. Cl.
*G06F 17/00* (2006.01)

(52) U.S. Cl. ............... 715/212; 715/216; 715/217; 715/219; 715/220

(58) Field of Classification Search ......... 715/503–504, 715/500, 808–809, 212, 216–220; 705/30–34; 345/808
See application file for complete search history.

(56) References Cited

U.S. PATENT DOCUMENTS

| | | | |
|---|---|---|---|
| 4,992,781 A | | 2/1991 | Iwasaki et al. |
| 5,021,973 A | | 6/1991 | Hernandez et al. |
| 5,121,499 A | * | 6/1992 | McCaskill et al. .......... 715/503 |
| 5,226,118 A | | 7/1993 | Baker et al. |
| 5,252,951 A | | 10/1993 | Tannenbaum |
| 5,278,390 A | | 1/1994 | Blankenship |
| 5,317,686 A | | 5/1994 | Salas et al. |
| 5,410,649 A | | 4/1995 | Gove |
| 5,416,895 A | | 5/1995 | Anderson et al. |
| 5,437,006 A | | 7/1995 | Turski |
| 5,455,903 A | | 10/1995 | Jolissaint et al. |
| 5,481,620 A | | 1/1996 | Vaidyananthan |
| 5,481,712 A | | 1/1996 | Silver et al. |
| 5,504,848 A | * | 4/1996 | Yamada et al. ............. 715/503 |
| 5,517,586 A | | 5/1996 | Knowlton |
| 5,537,104 A | | 7/1996 | Van Dort et al. |
| 5,546,525 A | * | 8/1996 | Wolf et al. ............... 345/809 |
| 5,574,930 A | | 11/1996 | Halverson, Jr. et al. |
| 5,590,259 A | | 12/1996 | Anderson et al. |
| 5,633,998 A | * | 5/1997 | Schlafly .................... 714/1 |
| 5,721,847 A | * | 2/1998 | Johnson .................... 345/786 |
| 5,742,504 A | | 4/1998 | Meyer et al. |
| 5,745,126 A | | 4/1998 | Jain et al. |
| 5,768,158 A | | 6/1998 | Adler et al. |
| 5,774,878 A | | 6/1998 | Marshall |
| 5,799,295 A | * | 8/1998 | Nagai ....................... 706/46 |
| 5,815,152 A | * | 9/1998 | Collier et al. ............. 345/839 |

(Continued)

FOREIGN PATENT DOCUMENTS

WO  9948000  9/1999

(Continued)

OTHER PUBLICATIONS

Excel 97 printout (herein after Printout), copyright 1996, pp. 1-14.*

(Continued)

*Primary Examiner*—Thu Huynh
(74) *Attorney, Agent, or Firm*—Anthony L. Miele

(57) ABSTRACT

An improved electronic spreadsheet is provided for applications requiring conditional expression execution behavior. Each cell having an executable expression is cooperative with an implicit conditional execution wrapper. The execution of each cellular expression is implicitly conditioned on the state of an individually assigned logical switch expression. The improved electronic spreadsheet also includes a user interface by which a user can assign logical switch expressions to a cell, or to a range of cells. The improved electronic spreadsheet facilitates the use of spreadsheets for wider range of applications than was possible with conventional electronic spreadsheets.

32 Claims, 2 Drawing Sheets

```
10 B3=Measure(Image)
20 IF(B1=FALSE) GOTO 40
30 B2 = B3
40 B4=(B3>B2-2)&(B3<B2+2)
```
13

U.S. PATENT DOCUMENTS

| | | | |
|---|---|---|---|
| 5,821,993 A | | 10/1998 | Robinson |
| 5,838,916 A | | 11/1998 | Domenikos et al. |
| 5,848,425 A | | 12/1998 | Lowry et al. |
| 5,883,623 A | | 3/1999 | Cseri |
| 5,893,128 A | * | 4/1999 | Nauckhoff .................. 715/511 |
| 5,910,895 A | * | 6/1999 | Proskauer et al. ........... 700/121 |
| 5,911,044 A | | 6/1999 | Lo et al. |
| 5,915,257 A | | 6/1999 | Gartung et al. |
| 5,926,822 A | * | 7/1999 | Garman ...................... 715/503 |
| 5,933,638 A | | 8/1999 | Cencik |
| 5,933,830 A | | 8/1999 | Williams |
| 5,940,296 A | | 8/1999 | Meyer et al. |
| 5,961,831 A | | 10/1999 | Lee et al. |
| 5,970,506 A | * | 10/1999 | Kiyan et al. ................. 715/503 |
| 5,991,760 A | | 11/1999 | Gauvin et al. |
| 6,032,157 A | | 2/2000 | Tamano et al. |
| 6,055,549 A | | 4/2000 | Takano |
| 6,058,434 A | | 5/2000 | Wilt et al. |
| 6,061,689 A | | 5/2000 | Chang et al. |
| 6,078,747 A | | 6/2000 | Jewitt |
| 6,094,684 A | | 7/2000 | Paullmann |
| 6,138,130 A | | 10/2000 | Adler et al. |
| 6,138,140 A | | 10/2000 | Yokote |
| 6,144,375 A | | 11/2000 | Jain et al. |
| 6,154,549 A | | 11/2000 | Arnold et al. |
| 6,167,469 A | | 12/2000 | Safai et al. |
| 6,195,092 B1 | | 2/2001 | Dhond et al. |
| 6,199,078 B1 | | 3/2001 | Brittan et al. |
| 6,222,531 B1 | | 4/2001 | Smith |
| 6,256,662 B1 | | 7/2001 | Lo et al. |
| 6,292,810 B1 | * | 9/2001 | Richards ..................... 715/503 |
| 6,298,474 B1 | | 10/2001 | Blowers et al. |
| 6,301,586 B1 | | 10/2001 | Yang et al. |
| 6,317,128 B1 | | 11/2001 | Harrison et al. |
| 6,317,750 B1 | * | 11/2001 | Tortolani et al. ......... 707/103 R |
| 6,332,163 B1 | | 12/2001 | Bosman-Amuah |
| 6,342,901 B1 | | 1/2002 | Adler et al. |
| 6,343,312 B1 | | 1/2002 | Yokote |
| 6,356,932 B1 | | 3/2002 | Yokote |
| 6,360,188 B1 | | 3/2002 | Freidman et al. |
| 6,366,284 B1 | | 4/2002 | McDonald |
| 6,388,654 B1 | | 5/2002 | Platzker et al. |
| 6,400,903 B1 | | 6/2002 | Conoval |
| 6,421,069 B1 | | 7/2002 | Ludtke et al. |
| 6,442,538 B1 | | 8/2002 | Nojima |
| 6,490,600 B1 | | 12/2002 | McGarry |
| 6,504,575 B1 | | 1/2003 | Ramirez et al. |
| 6,565,609 B1 | | 5/2003 | Sorge et al. |
| 6,592,626 B1 | * | 7/2003 | Bauchot et al. ............. 715/503 |
| 6,631,497 B1 | | 10/2003 | Jamashidi et al. |
| 6,826,756 B1 | | 11/2004 | Herrod et al. |
| 6,931,602 B1 | | 8/2005 | Silver et al. |
| 2001/0029049 A1 | | 10/2001 | Walt et al. |
| 2002/0184347 A1 | | 12/2002 | Olsen et al. |
| 2003/0115545 A1 | * | 6/2003 | Hull et al. ................... 715/500 |
| 2003/0160869 A1 | | 8/2003 | Koyama |
| 2003/0177448 A1 | | 9/2003 | Levine et al. |

FOREIGN PATENT DOCUMENTS

| | | |
|---|---|---|
| WO | 0111445 | 2/2001 |

OTHER PUBLICATIONS

Ray et al., "Using Microsoft Excel 97", copyright 1997, pp. 189-211 and 746-747.*

Ray et al., "Using Microsoft Excel 97", copyright 1997, pp. 189-211 and 862-864.*

Excel 97 printout (herein after Excel), copyright 1996, pp. 1-12.*

Hallberg et al., "Using Microsoft Excel 97", copyright 1997, pp. 682-684.

Bruce Hallberg, Using Microsoft Excel 97, Special Edition Using Microsoft Excel 97, Bestseller Edition, Chapter 6, pp. 189-211.

Chester, Thomas, et al. Mastering Excel 97, 1997, sybex, $4^{th}$ Edition, pp. 56, 57, 107, 139.

Gary A. Mintchell, Vision Systems Revealed, Nov. 1998 control Engineering Back to Basics: Control Engineering Online.

Amitabh Varshney & Arie Kaufman, Finesse, A Financial Information Spreadsheet, Department of Computer Science, State University of New York at Stony Brook, Stony Brook, NY 11794-4400, IEEE 1996.

Banerjea, Dave K., Smart Choices in Calibration Management Software, Apr. 1998, downloaded from url;http:/www.qualitydigest.com/april98/html/calsoft, pp. 1-8.

Titus, Jon, Machine-Vision Software: It's Not Just for Experts, Test & Measurement World, downloaded from url:<http:/www.tmworld.com/articles/04_15_1999_machine_vision.html>, Apr. 15, 1999, pp. 1-7.

Hasler A. F. et al.; A High Performance Interactive Image Spreadsheet (IISS), Computers in Physics, American Institute of Physics, Woodbury, NY, US, vol. 8, No. 3, May 1, 1994, pp. 325-342.

Piersol K .W., Object Oriented Spreadsheets, The Analytic Spreadsheet Package Oopsla. Object-Oreientated Programming Systems, Languages and Applications. Conference Proceedings, Sep. 1986, pp. 385-390.

Levoy M; Spreadsheets for Images; Computer Graphics Proceedings, Annual Conference Series, Siggraph, Jul. 24, 1994, pp. 139-146.

Nunez F. et al.; Vissh; A Data Visualisation Spreadsheet Proceedings of the Joint Europgraphics and IEEE TCVG Symposium on Visualization, Data Visualization, May 29, 2000, pp. 209-218.

Brown A: DSP Design with Dadisp Electronics World and Wireless World, Reed Business Publishing, Sutton, Surrey, GB, vol. 95, No. 1646 Dec 1, 1989, pp. 1151-1154.

Varshney A et al: Finesse: A Financial information Spreadsheet, Information Visualization 96, Proceedings IEEE Symposium on San Francisco, CA, Oct. 28-29, 1996, Los Alamitos, Ca, IEEE Comput. Soc. Oct. 28, 1996, pp. 70-71, 125.

Cognex 3000/4000/5000 Development Enviroment 1, Revision 7.6 Chapter 3, Communication Utilities 1996.

Panasonic's New Network Camera Focuses on Security, Panasonic Press Room, Las Vegas, Jan. 2001.

Lubofsky, Evan, Moving Beyond the End of the line, Cognex Corporation, Machine Vision, Sensor Magazine, Aug. 2001.

Valverde, Michael, Wake up to the reality of the smart factory, Industrial Computing Magazine, Feb. 12, 2002.

European Application No. 0957463.3, Office Action dated, Mar. 9, 2004.

European Application No. 0957463.3, Office Action response dated, May 1, 2005.

European Application No. 0957463.3, Office Action dated, Aug. 7, 2008.

European Application No. 0953910.7, Office Action dated, Sep. 6, 2004.

European Application No. 0953910.7, Office Action response dated, Aug. 19, 2005.

European Application No. 0953910.7, Office Action dated, Sep. 2, 2008.

Office Actions and Office Action responses from the now abandoned U.S. Appl. No. 09/635,503, office action prosecution file history ranges from Dec. 30, 2003 through Feb. 21, 2007.

Office Actions and Office Action responses from the now abandoned U.S. Appl. No. 09/635,365, office action prosecution file history ranges from Dec. 9, 2003 through Jun. 15, 2009.

File history for issued US Patent No. 6,859,907, U.S. Appl. No. 09/370,706, prosecution file history ranges from Sep. 9, 2002 through Nov. 2, 2004.

File history for issued US Patent No. 7,107,519, U.S. Appl. No. 09/932,119, prosecution file history ranges from Jul. 23, 2004 through May 9, 2006.

* cited by examiner

CONDITIONAL CELL EXECUTION IN ELECTRONIC SPREADSHEETS

FIELD OF THE DISCLOSURE

The present disclosure related to electronic spreadsheets, and more particularly to computer programming using electronic spreadsheets.

BACKGROUND OF THE DISCLOSURE

The superior ease-of-use characteristics of electronic spreadsheets are well-known, especially in the field of office automation. The use of electronic spreadsheets in other fields is also know, although in the past, many computer applications have been unable to take advantage of the spreadsheet metaphor. One reason for this may be computer applications are often required to exhibit conditional statement execution behavior. However, conditional statement execution behavior is beyond the capability of conventional electronic spreadsheet programs.

In the field of pattern recognition, for example, it is common for a single program to execute one set of instructions during training, and another set of instructions during classification, the instructions for classification being dependent on exemplar data extracted during training. In this field it is also common for programs to dynamically adapt their order of execution based on external control parameters. Consequently, known electronic spreadsheets cannot adequately be used for programming applications in the field of pattern recognition.

In conventional programming, positional order of program statements and conditional branching within program statements drive the order of execution of the program statements. In the BASIC programming language, for example, a program statement at line 20 in a program listing is always executed after the program statement at line 10, unless a branch statement is encountered and a jump instruction is invoked.

Unlike a programming language, an electronic spreadsheet is essentially a means for graphically representing a single expression by distributing the expression across a rectangular grid of cells (or any regular array of cells), each cell being a parenthetical expression that can be a function of some number of other expressions in cells across the grid. As in typical expression evaluation, precedence and dependencies drive the order of execution. Since the order of executing is not explicitly programmed, there is no spreadsheet equivalent to a jump instruction in conventional spreadsheets. The limitation of conventional spreadsheets makes programming certain kinds of behavior difficult, if not impossible.

Conventional electronic spreadsheets are known to support limited conditional behavior, e.g., conditional argument value assignment using the standard IF functions. An IF function consists of three arguments: A, B, and C, where argument A is a logical switch expression, and arguments B and C are the two possible expressions to be evaluated. If the expression in argument A evaluates TRUE, the expression in argument B is evaluated and returned. If the expression in argument A evaluates FALSE, the expression in argument C is evaluated and returned.

Like IF, the CHOOSE function simply evaluates and returns one of N expressions. The evaluation of the expression in the first argument of the CHOOSE function determines which of the N expressions will be evaluated and returned, which is essentially a generalization of the IF function. However, the functions IF, CHOOSE, and similar functions, are only capable of selecting among result values, and are incapable of controlling the order of execution of expressions associated with a cell or a set of cells within the spreadsheet.

SUMMARY OF THE DISCLOSURE

In accordance with one embodiment apparatus may be provided, which comprise an electronic spreadsheet generator, stored executable expressions, switch expressions, a user interface, an evaluator, and an execution controller. The electronic spreadsheet generator is configured to generate a spreadsheet on a computer screen, the spreadsheet having a plurality of cells. The stored executable expressions respectively correspond to select ones of the plurality of cells. The switch expressions respectively correspond to the cells. The user interface is configured to receive data for and to display, on a computer screen, cells of the spreadsheet, the executable expressions, and the switch expressions. The evaluator is configured to evaluate a given switch expression from among the switch expressions, the given switch expression corresponding to a given cell among the plurality of cells. The execution controller is configured to allow a given executable expression corresponding to the given cell to be executed when the given switch expression is evaluated to create one result, and is configured to disallow the given executable expression to be executed when the given switch expression is evaluated to create another result. The given switch expression for the given cell is supplemental to the given executable expression.

BRIEF DESCRIPTION OF DRAWING

Aspects of the disclosure will be more fully understood from the following detailed description, in conjunction with the following figures, wherein.

DETAILED DESCRIPTION

Figures 1, 2:
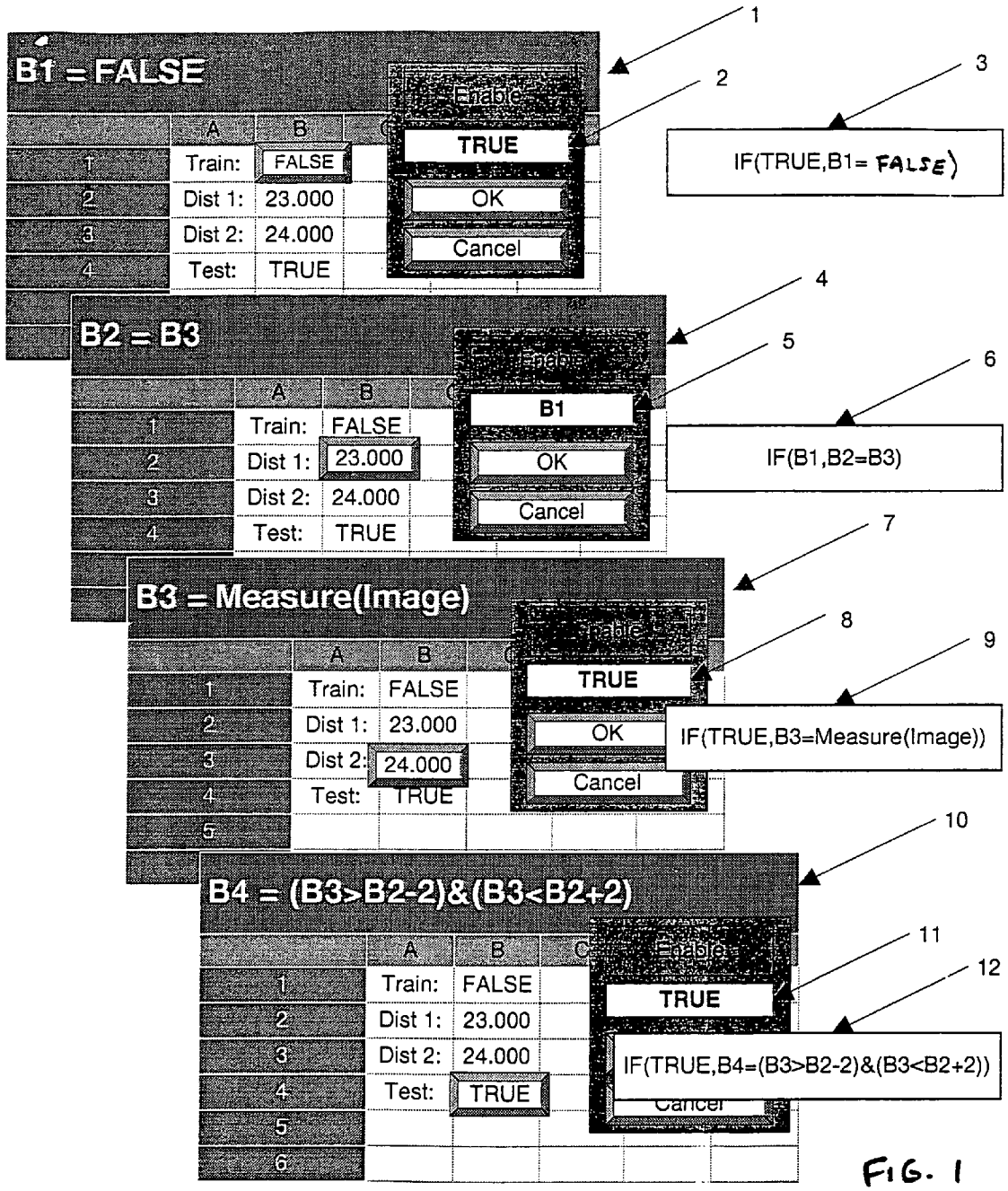
FIG. 1 is a sequence of four instances of a portion of an electronic spreadsheet per one embodiment, each instance including a dialog box and a pop-up window making explicit the logical switch expression of the conditional wrapper associated with each cell of the embodiment.
FIG. 2 is a listing BASIC computer program that is the functional equivalent of the spreadsheet of FIG. 1.

Embodiments of the disclosure provide methods and apparatuses for programming conditional execution behavior in an electronic spreadsheet, and methods of programming the order of execution of expressions associated with cells in an electronic spreadsheet. While providing such methods and apparatuses, the fundamental characteristics of conventional electronic spreadsheets can be preserved to a high degree. Moreover, the disclosed methods and apparatuses for programming conditional behavior in electronic spreadsheets may be made to be easy and intuitive to use.

An embodiment includes implicit conditional wrappers associated with each cell of the electronic spreadsheet, whereby the execution of each cellular expression is conditioned upon the state of an individually assigned logical switch expression included in an associated implicit conditional wrapper.

In a preferred embodiment, every expression in every cell is enabled or disabled by an implicit conditional wrapper. This implicit conditional wrapper uses a logical switch expression to control the execution of the cell's expression, i.e., to enable or disable the execution of the cell's expression based on the value of the logical switch expression.

In a preferred embodiment, the logical switch expression is entered into the implicit conditional wrapper of a cell using a pop-up dialog box and an associated pop-up window, for example. The dialog box can then be closed by the user, causing the pop-up window and its entered logical switch expression to disappear along with the dialog box. Closing the dialog box makes the logical switch expression appear to no longer be associated with the cell, thereby making the logical switch expression invisible or "implicit", because the existence and nature of the logical switch expression is not visible to the user solely by looking at the contents of the cell. However, the effects of the logical switch expression become manifest upon execution of the electronic spreadsheet.

The logical switch expression can be any legal spreadsheet expression that can be evaluated to logical TRUE or FALSE. If the logical switch expression evaluates to TRUE, the cell's corresponding expression is evaluated, a new result value is returned, and the cell's internal result buffer is updated accordingly. If the logical switch expression evaluates FALSE, the cell's expression is not evaluated, and the cell's result buffer is returned unmodified.

In a preferred embodiment, individual switch expressions are initialized to a constant logical TRUE. In another preferred embodiment, the spreadsheet user interface supports the interactive assignment of a switch expression to any cell or range of cells within the spreadsheet, using dialog boxes and pop-up windows, for example. A user selecting a "cell state" display mode from a menu after selecting a cell will cause a dialog box to appear, along with an associated window that displays the associated logical switch expression.

The default behavior of the improved electronic spreadsheet is unaffected by the extension and improvements described above if all individual logical switch expressions are initialized to a constant logical TRUE. In this case, a user can ignore the implicit conditionals. Alternatively, the user can mark arbitrary sets of cells, and then selectively assign logical switch expressions to program desired electronic spreadsheet behavior beyond the capacity of known electronic spreadsheets, such as providing various orders of cell execution.

Per certain embodiments, the conventional spreadsheet metaphor can be efficiently and elegantly extended to meet many of the fundamental requirements of conditional expression execution in computer programming.

Figure 3:
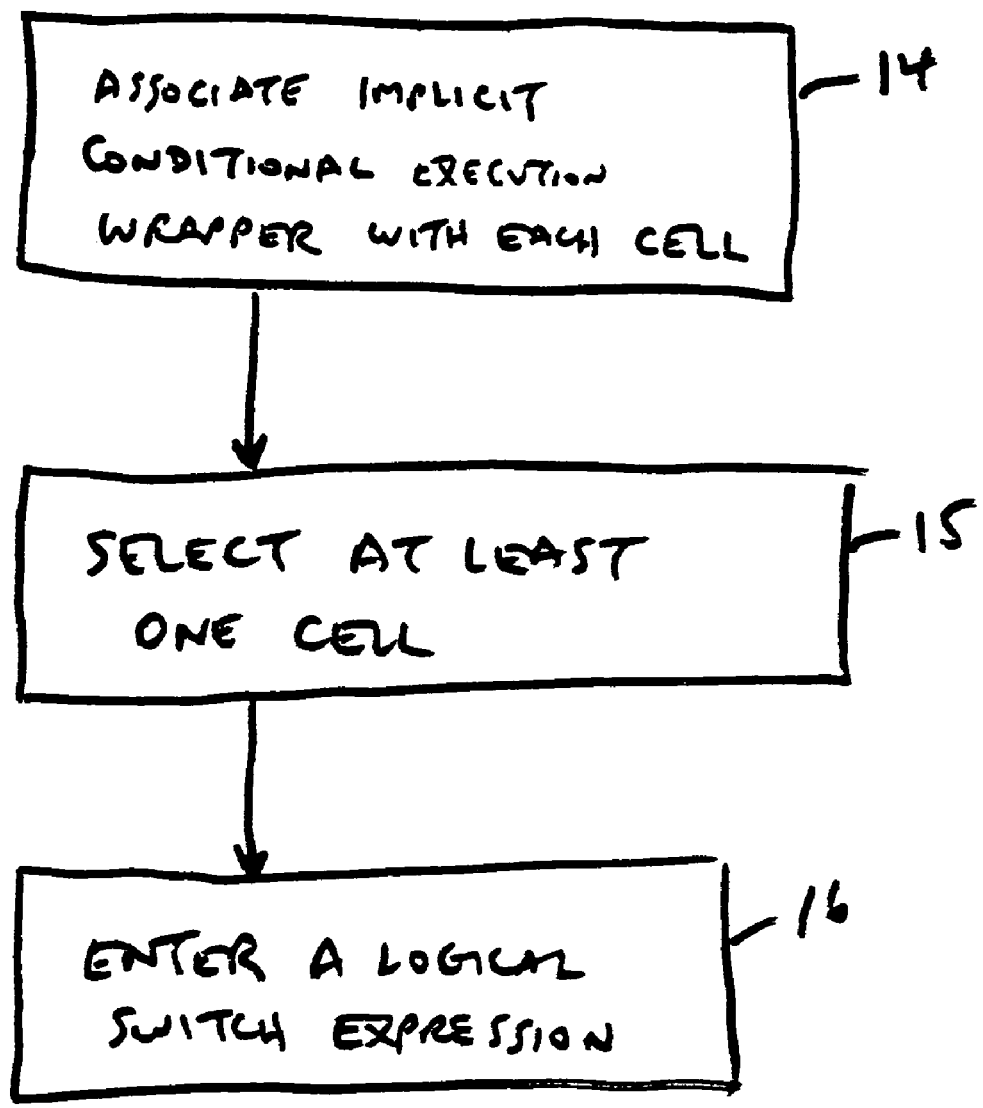
FIG. 3 is a flow chart illustrating an embodiment of a method for programming conditional execution in an electronic spreadsheet.

FIG. 1 shows a sequence of four instances 1, 4, 7, 10 of a portion of an electronic spreadsheet incorporating certain improvements of the present disclosure. In the first spreadsheet instance 1, cell B1 is selected by a user, and is seen to be equal to the logical constant FALSE. After a user selects a "cell state" display mode from a pull-down menu, selecting a cell or plurality of cells causes an enable dialog box 2 to appear as well as causing an associated logical switch expression pop-up window 3 to appear (also see FIG. 3, step 15). The enable dialog box 2, superimposed on the spreadsheet grid, shows that the enable switch expression is equal to the logical constant TRUE, indicating that the expression in B1 will be executed. It is also possible for the user to change the enable switch expression by entering a new enable switch expression 15, as shown in FIG. 3.

Thus, the value of B1 will be FALSE, provided that the enable switch expression that controls the execution of cell B1 is set to TRUE. The implicit conditional expression (including the enable switch expression) that controls the execution of cell B1 is shown in the pop-up window 3 that appears with the enable dialog 2, and contains the logical expression: IF(TRUE, B1=FALSE).

In spreadsheet instance 4, cell B2 is selected and conditionally set equal to the results of the expression evaluated in B3, based on the conditional expression in the pop-up window 6. Enable dialog 5 shows that the enable switch expression is equal to the result of expression evaluated in cell BI. Since B1 is known to evaluate to FALSE, in this case, the expression in B2 will not be executed. The implicit conditional expression associated with cell B2 is shown in the pop-up window 6.

In spreadsheet instance 7, cell B3 is selected and set equal to the result of an image measurement function performed on an external image data buffer. Enable dialog 8 shows that the enable switch expression is equal to the logical constant TRUE, indicating that the expression in B3 will be executed. The implicit conditional expression associated with cell B3 is shown in the pop-up window 9.

In spreadsheet instance 10, cell B4 is selected and set equal to the result of a logical operation performed on the results of the expressions evaluated in B2 and B3. Enable dialog 11 shows that the enable switch expression is equal to the logical constant TRUE, indicating that the expression in B4 will be executed. The implicit conditional expression associated with cell B4 is shown in the pop-up window 12.

Referring to FIG. 2, a BASIC program fragment 13 shows the BASIC program steps that together are equivalent to the electronic spreadsheet program shown in FIG. 1. This BASIC program will exhibit the same behavior, i.e., evaluate expressions, assign values, and transfer program control, so as to achieve the same result as the execution of the illustrated embodiment of an electronic spreadsheet, yet via an entirely different user interface. FIG. 2 emphasizes and illustrates that the illustrated example spreadsheet can achieve functionality that was previously not possible in electronic spreadsheets, and prior to the present disclosure, was possible only using computer languages like BASIC, COBOL, FORTRAN, and C, for example.

In the forgoing example illustrated in FIG. 1, a spreadsheet is programmed to behave in one of two possible ways, depending on cell B1. If the expression in cell B1 is set to TRUE (thereby indicating that the spreadsheet is in training mode in the example of FIG. 1), the spreadsheet executes a training sequence whereby the results of an image measurement executed in cell B3 are saved in cell B2 for future comparisons.

If the expression in cell B1 evaluates to FALSE (thereby indicating testing mode in the example of FIG. 1), the training step associated with the expression in cell B1 is not executed. The expression in cell B4 goes on to perform a test which compares the current image measurement performed in B3 to the measurement saved on the most recent training cycle in cell B2.

Other modifications and implementations will occur to those skilled in the art without departing from the spirit and the scope of the invention as claimed. Accordingly, the above description is not intended to limit the invention except as indicated in the claims now or as they may be amended.

What is claimed is:

1. A method for use with a computer, the method being for programming conditional execution of program statements in an electronic spreadsheet having a plurality of cells, the method comprising:
associating program statements with respective cells of the plurality of cells;

associating a conditional cell execution wrapper with each cell, the conditional cell execution wrapper programmably controlling whether the cell will execute upon execution of the electronic spreadsheet;

selecting, via a computer screen interface, at least one cell from among the plurality of cells; and entering, via a computer screen interface, a programmable logical switch expression into the conditional cell execution wrapper associated with the selected at least one cell, an evaluation of the programmable logical switch expression programmably controlling, upon execution of the electronic spreadsheet, the execution and non-execution of a corresponding one of the program statements associated with the selected at least one cell;

wherein the programmable logical switch expression is supplemental to the corresponding one of the program statements, and wherein the programmable logical switch expression is built in the electronic spreadsheet.

2. Computer apparatus for programming conditional execution of program statements in an electronic spreadsheet having a plurality of cells, the computer apparatus comprising:

means for associating program statements with respective cells of the plurality of cells;

means including a processor and memory configured to associate a conditional cell execution wrapper with each cell, the conditional cell execution wrapper programmably controlling whether the cell will execute upon execution of the electronic spreadsheet;

means for selecting at least one cell; and means for entering a programmable logical switch expression into the conditional cell execution wrapper associated with the selected at least one cell, an evaluation of the programmable logical switch expression controlling, upon execution of the electronic spreadsheet, the execution and non-execution of a corresponding one of the program statements associated with the selected at least one cell;

wherein the programmable logical switch expression is supplemental to the corresponding one of the program statements, and wherein the programmable logical switch expression is built in the electronic spreadsheet.

3. The method of claim 1, further comprising:

in conjunction with selecting a cell, selecting a "cell state" display mode.

4. The method of claim 3, wherein selecting a cell causes an executable expression within the cell to appear in a formula bar in the spreadsheet, and causes the conditional cell execution wrapper to appear explicitly as a dialog box.

5. The method of claim 4, further comprising:

displaying a logical switch expression within a pop-up window, the logical switch expression being associated with the conditional cell execution wrapper.

6. The method of claim 3, wherein selecting the "cell state" display mode is accomplished using a pull-down menu.

7. Apparatus comprising:

an electronic spreadsheet generator including a processor and memory configured to generate a spreadsheet in accordance with a spreadsheet application on a computer screen, the spreadsheet having a plurality of cells;

stored executable expressions respectively corresponding to select ones of the plurality of cells;

stored switch expressions preconfigured by the spreadsheet application to respectively correspond to the cells, the stored switch expressions being built in the spreadsheet application;

a user interface configured to receive data for and to display, on a computer screen, cells of the spreadsheet, the executable expressions, and the switch expressions;

an evaluator configured to evaluate a given switch expression from among the switch expressions, the given switch expression corresponding to a given cell among the plurality of cells; and an execution controller preconfigured to allow a given executable expression corresponding to the given cell to be executed when the given switch expression is evaluated to create one result, and configured to disallow the given executable expression to be executed when the given switch expression is evaluated to create another result;

wherein the given switch expression for the given cell is supplemental to the given executable expression.

8. The apparatus of claim 7, further comprising:

a selection user interface for selecting, via a computer screen, a cell or range of cells.

9. The apparatus of claim 8, wherein the selection user interface includes an interactive assignor that interactively, via user interaction with a screen and an input device, assigns a switch expression from among the switch expressions to any cell or range of cells within the spreadsheet.

10. The apparatus of claim 8, wherein the selection interface includes a cell selector that selects, via computer screen interaction, an arbitrary set of the plurality of cells, and an interactive assignor that selectively, via computer screen interaction, assigns a switch expression to each cell of the selected arbitrary set, in order to program a desired cell execution sequence upon execution of the spreadsheet.

11. The apparatus of claim 7, further comprising:

a user interface for assigning, via a computer screen, the switch expressions to conditional cell execution wrappers.

12. The apparatus of claim 7, wherein the switch expressions include logical switch expressions including a given logical switch expression that can be evaluated to logical TRUE or logical FALSE, the given logical switch expression corresponding to a corresponding cell.

13. The apparatus of claim 12, wherein if the given logical switch expression evaluates TRUE, the executable expression of the corresponding cell is evaluated, a new result value is returned, and an internal result buffer of the corresponding cell is updated.

14. The apparatus of claim 12, wherein if the logical switch expression evaluates FALSE, the executable expression of the corresponding cell is not evaluated, and an internal result buffer of the corresponding cell is returned unmodified.

15. The apparatus of claim 12, wherein individual ones of the logical switch expressions are initialized to a constant logical TRUE.

16. The apparatus according to claim 7, wherein the user interface is configured to display, on the computer screen, cells of the spreadsheet while concurrently displaying, on the computer screen, at least one of the executable expressions.

17. The apparatus according to claim 7, wherein the switch expressions include cell execution control switch expressions.

18. The apparatus according to claim 17, wherein the switch expressions are conditional switch expressions.

19. The apparatus according to claim 18, wherein the conditional switch expressions include cooperative conditional switch expressions.

20. The apparatus according to claim 7, wherein the switch expressions include programmable switch expressions.

21. The apparatus according to claim 20, wherein the programmable switch expressions include programmable logical switch expressions.

22. The apparatus according to claim 7, wherein the switch expressions include a switch expression for each cell of the plurality of cells.

23. The apparatus according to claim 7, wherein the apparatus further comprises a display mechanism to present the switch expressions in a programmable form via a computer screen display.

24. The apparatus according to claim 7, wherein the evaluator is configured to evaluate plural switch expressions including the given switch expression.

25. Apparatus comprising:
an execution controller including a processor and memory configured to drive execution of a program including expressions and parameters, subsets of the expressions and the parameters being associated with respective cells of a computer screen viewable grid of the cells, wherein the execution of the program when driven through plural consecutive runs, the consecutive runs including an earlier run and a current run after the earlier run;
a "cell execution jump" screen input configured to cause a given expression associated with a given cell during the current run to be jumped so that the given cell's last executed result, as determined when the given cell was last executed during the earlier run prior to the current run, remains unchanged, wherein the given cell's last executed result was determined during the earlier run in accordance with earlier expressions and parameters associated with the given cell during the earlier run, wherein the content of the current expressions and parameters currently associated with the given cell during the current run is not executed; and
wherein the cell execution jump screen input is configured to be able to receive switch information before the current run, thereby causing the current expressions and parameters associated with the given cell during the current run to be jumped during the current run.

26. Apparatus comprising:
an engine including a processor and memory configured to execute a spreadsheet program of a spreadsheet to carry out image measurement, the spreadsheet program being programmable to have at least two modes, including a non-train mode whereby a given "mode switch" cell may be configured so that the spreadsheet is in the non-train mode when the mode switch cell has one value and so that the spreadsheet is in the train mode when the mode switch cell has another value;
a train value cell including, associated therewith, a grid displayed train result, a skip switch, and a train expression, the train expression when executed causing the train result to be as determined by execution of the train expression, and the skip switch being configurable to cause the execution of the train expression to be foregone for a current execution of the spreadsheet so that an earlier train result remains displayed, the earlier train result having been determined during an earlier execution of an earlier associated train expression; and
wherein the skip switch is configurable to either forego execution of the train expression or execute the train expression as a function of a state of the mode switch.

27. Apparatus comprising:
an execution controller including a processor and memory configured to drive execution of a program, in accordance with expressions and parameters associated with cells of a computer screen viewable grid of the cells, wherein the execution of the program when driven through plural consecutive runs, the consecutive runs including an earlier run and a current run after the earlier run, and wherein, during the current run, when a switch is in one mode, a given expression associated with a given cell of the cells is not executed, so that a current result of the given cell during the current run is the earlier result of the given expression when executed during the earlier run, and when the switch is in another mode, the given expression is executed so that a current result of the given cell during the current run is the current result of the given expression when executed during the current run.

28. Apparatus according to claim 27, wherein the program includes a spreadsheet.

29. Apparatus according to claim 28, further comprising a stored switch expression configurable to cause the switch to be in one of the one mode and the another mode.

30. Apparatus according to claim 27, wherein the stored switch expression is associated with the given cell.

31. A method comprising:
executing a spreadsheet program to carry out image measurement, the spreadsheet program being programmable to have at least two modes, including a non-train mode whereby a given "mode switch" cell may be configured so that the spreadsheet is in the non-train mode when the mode switch cell has one value and so that the spreadsheet is in the train mode when the mode switch cell has another value;
providing a train value cell including, associated therewith, a grid displayed train result, a skip switch, and a train expression, the train expression when executed causing the train result to be as determined by execution of the train expression, and the skip switch being configurable to cause the execution of the train expression to be foregone for a current execution of the spreadsheet so that an earlier train result remains displayed, the earlier train result having been determined during an earlier execution of an earlier associated train expression; and
wherein the skip switch is configurable to either forego execution of the train expression or execute the train expression as a function of a state of the mode switch.

32. A method comprising:
configuring an execution controller to drive execution of a program, in accordance with expressions and parameters associated with cells of a computer screen viewable grid of the cells, wherein the execution of the program may be driven through plural consecutive runs, the consecutive runs including an earlier run and a current run after the earlier run, and wherein, during the current run, when a switch is in one mode, a given expression associated with a given cell of the cells is not executed, so that a current result of the given cell during the current run is the earlier result of the given expression when executed during the earlier run, and when the switch is in another mode, the given expression is executed so that a current result of the given cell during the current run is the current result of the given expression when executed during the current run.

\* \* \* \* \*